May 21, 1929.  W. L. LASSETER  1,714,381
ADJUSTABLE LOOP HOOK FOR BACK BANDS
Filed July 18, 1928
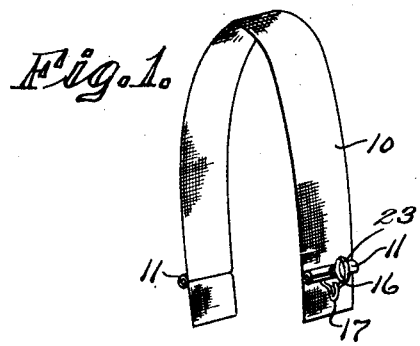
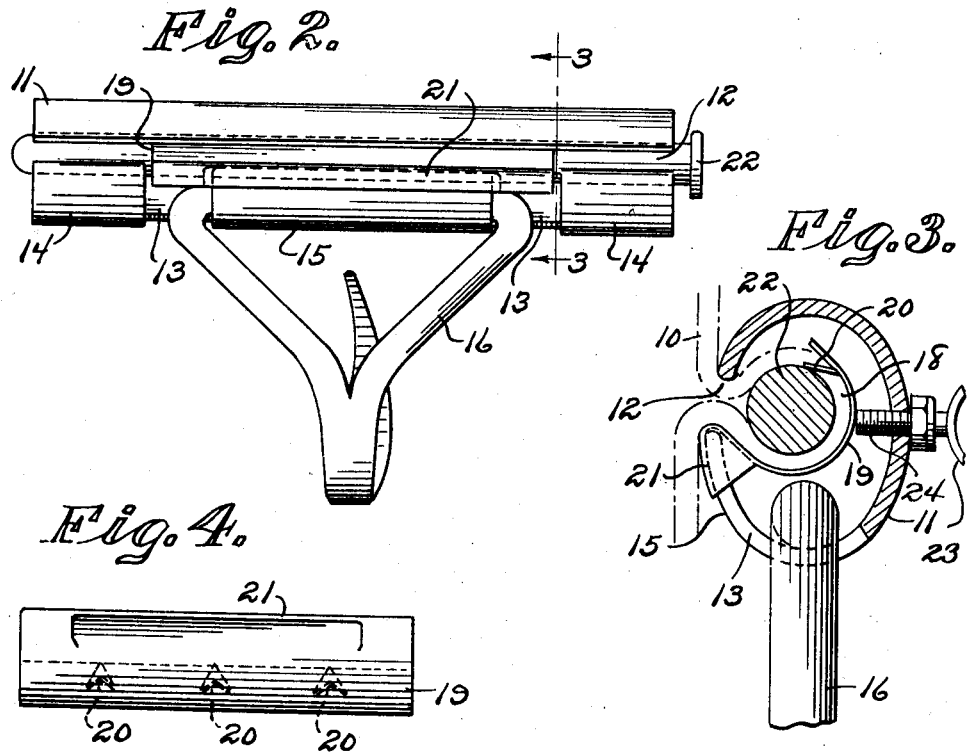
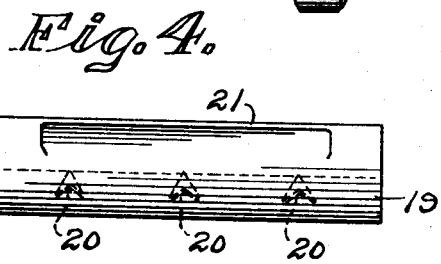
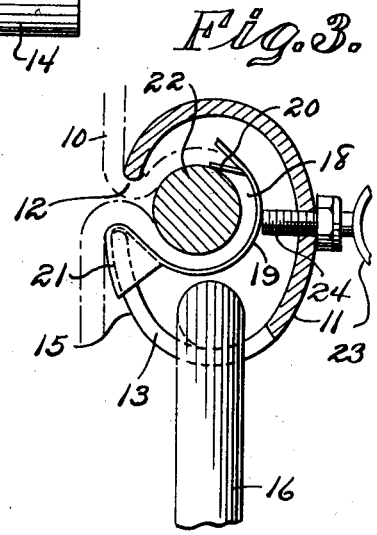
Walter Leo Lasseter
INVENTOR
BY Victor J. Evans
ATTORNEY
WITNESS:

Patented May 21, 1929.

1,714,381

UNITED STATES PATENT OFFICE.

WALTER LEO LASSETER, OF ENTERPRISE, ALABAMA.

ADJUSTABLE LOOP HOOK FOR BACKBANDS.

Application filed July 18, 1928. Serial No. 293,539.

This invention relates to supporting devices adapted to be worn upon horses, mules and other beasts of burden to support trace chains or other draft devices.

Another object of the invention contemplates hook members adapted to engage the trace chains without necessitating opening thereof.

An additional object of the invention contemplates a strap or belt adapted to be extended over the back of the animal and to support the hooks adjacent the ends thereof.

A further object of the invention consists in the provision of pivot members for the hooks, whereby the latter may be arranged off from the ribs of the animal to prevent chafing.

More specifically stated the pivot member is provided with a locking mechanism whereby the hooks may be disposed at different heights upon the sides of the animal in conjunction with the trace chain to alter the line of draft.

With the above and other objects in view, the invention further consists in the following novel features and details of construction, to be hereinafter more fully described, illustrated in the accompanying drawing and pointed out in the appended claims.

In the drawing:—

Figure 1 is a perspective view of the invention.

Figure 2 is a top plan view of the invention per se.

Figure 3 is a horizontal sectional view taken on line 3—3 of Figure 2.

Figure 4 is a bottom plan view of the locking element.

Referring to the drawing in detail, wherein like characters of reference denote corresponding parts, the reference character 10 indicates a webbing or band adapted to be passed over the back of a beast of burden. Barrels 11 split, as at 12, longitudinally thereof are adapted for connection with portions removed, such as indicated at 13, upon one side edge of the split portion 12 to provide end and intermediate lips 14 and 15 respectively. The portions removed 13 and the split portion 12 permit insertion of loops 16 for loop hooks 17. The extremities of the hooks 17 are extended appreciable distances within the looped portions thereof, whereby the links of trace chains engaged thereby may not become accidentally displaced therefrom.

Portions of the band or belting 10 are transversely looped, as illustrated at 18 in Figure 3 of the drawing, and passed through the slot or split portion 12 in the barrels 11.

A locking mechanism comprising a semicircular plate 19 adapted to accommodate an appropriate portion of the loops 18 are provided with teeth 20 adapted for biting engagement with said loops within the barrels. Guards or shields, such as indicated at 21, and carried upon the outermost side edges of the locking plates 19, are adapted to accommodate the intermediate lips 15 of the barrels 11 in the manner as best illustrated in Figures 2 and 3 of the drawing. The looped portions 18 of the band or webbing 10 are adapted for insertion within the bore and split portions 12 of the barrels 11 in conjunction with the locking plates 19.

Locking pins 22 are then inserted within the loops 18 and force same toward the teeth 20 of the locking plates 19 whereby lateral shifting movement of the looped portions 18 of the band or webbing 10 within the barrels 11 will be prevented, inasmuch as two different locking connections are established therebetween, namely, that of the teeth 20 engaging and biting the looped portions 18 and of the guard and lip connection between the locking plates 19 and the barrels.

The locking mechanism is such that the barrels 11 and the looped portions 18 of the band or webbing 10 will be held against displacement whereby distortion of the band or webbing toward the flanks of the animal near the hips and annoying same will be obviated.

As generally known plowmen sometimes regulate the depth of their plows by shifting the band upon the back of the animal. With the present invention the same work may be accomplished by adjustment of the hooks from a given position, whereby the beast of burden will not be annoyed by improper location of the band.

Terrets, such as indicated at 23, are provided with shanks 24 threadedly engaged within openings horizontally disposed at intermediate points in the length of the barrels 11, substantially as illustrated in Figure 3 of the drawing. Jam nuts 25, carried upon the shanks 24, are adapted to engage the outer surfaces of the barrels 11 whereby the terrets will be lockingly retained in position for use. The terrets are employed to support the lines or reins to keep them from becoming tangled in the animal's feet. Many times, the farmers while plowing drop their lines and if the animal becomes frightened and not having protection offered by the lines will become tangled in the forefeet of the animal and trip him up.

The invention is susceptible of various changes in its form, proportions and minor details of construction, and the right is herein reserved to make such changes as properly fall within the scope of the appended claims.

Having thus described the invention, what is claimed is:—

1. A belt loop hook adjuster and fastener therefor comprising a barrel, said barrel being split to receive loops of the belt and hook, and means carried within the barrel lockingly engaging the loop portions of the belt therein.

2. A belt loop hook adjuster and fastener therefor comprising a barrel, said barrel being split and having openings in communication therewith to accommodate appropriate portions of the hook, the loop of the band arranged within the barrel and projected through the split portion thereof, and means carried within the barrel lockingly engaged with the looped portion of the belt.

3. A belt loop hook adjuster and fastener therefor comprising a split barrel, said loop being inserted within the barrel and projected through the split portion thereof, a guard engaging the loop within the barrel, and tooth means carried by the guard lockingly engaging the loop.

4. A belt loop hook adjuster and fastener therefor comprising a split barrel, said barrel having openings in communication with the split portion to provide a multiplicity of lips upon one side thereof, said band having a looped portion passed through the split of the barrel, a locking plate engaging the outer surface of the loop and having a guard upon one end to accommodate the adjacent portion of the aforementioned lip, teeth carried by the locking plate bitingly engaging said loop, and a locking pin passed through the loop portion of the band and forcing the latter toward the teeth.

5. A hook construction comprising a barrel split in end to end relation, said barrel having openings adjacent the ends thereof in communication with the split, a hook, and a loop formed upon the attaching portion of the hook within the barrel having portions thereof disposed within said openings.

In testimony whereof I affix my signature.

WALTER LEO LASSETER.